United States Patent
Santillan Gutierrez et al.

(10) Patent No.: US 10,711,813 B2
(45) Date of Patent: Jul. 14, 2020

(54) ATTACHMENT DEVICE PROVIDING DOUBLE ENGAGEMENT FOR HIGH RETENTION

(71) Applicant: FORD GLOBAL TECHNOLOGIES, LLC, Dearborn, MI (US)

(72) Inventors: Diego Santillan Gutierrez, Tizayuca (MX); Fernando Paisano Rodriguez, San Andres Cholula (MX); Izcoatl Herrera, Azcapotzalco (MX)

(73) Assignee: Ford Global Technologies, LLC, Dearborn, MI (US)

(*) Notice: Subject to any disclaimer, the term of this patent is extended or adjusted under 35 U.S.C. 154(b) by 52 days.

(21) Appl. No.: 15/839,220

(22) Filed: Dec. 12, 2017

(65) Prior Publication Data
US 2019/0178270 A1    Jun. 13, 2019

(51) Int. Cl.
*F16B 5/00* (2006.01)
*F16B 5/12* (2006.01)
*F16B 5/06* (2006.01)
*E04B 1/61* (2006.01)

(52) U.S. Cl.
CPC .......... *F16B 5/0016* (2013.01); *F16B 5/0084* (2013.01); *F16B 5/0664* (2013.01); *F16B 5/126* (2013.01); *E04B 1/6137* (2013.01)

(58) Field of Classification Search
CPC ...... F16B 5/0016; F16B 5/126; F16B 5/0084; E04B 1/61
See application file for complete search history.

(56) References Cited

U.S. PATENT DOCUMENTS

| 4,639,982 | A | * | 2/1987 | Kasai | A44B 11/266 24/616 |
| 5,353,571 | A | * | 10/1994 | Berdan | B60R 13/04 24/293 |
| 5,671,513 | A | * | 9/1997 | Kawahara | F16B 21/06 24/581.11 |
| 5,699,601 | A | | 12/1997 | Gilliam et al. | |
| 6,421,889 | B1 | * | 7/2002 | Chien | A44B 11/266 24/614 |

(Continued)

FOREIGN PATENT DOCUMENTS

| CN | 203126733 U | 8/2013 |
| CN | 104343774 A | 2/2015 |

(Continued)

OTHER PUBLICATIONS

English Machine Translation of CN104343774A.
English Machine Translation of CN203126733U.
English Machine Translation of JP4017718B2.

*Primary Examiner* — Basil S Katcheves
*Assistant Examiner* — Omar F Hijaz
(74) *Attorney, Agent, or Firm* — David Coppiellie; King & Schickli, PLLC (57) ABSTRACT

An attachment device for securing two component parts together includes a snap tab fastener and a snap tab housing. The snap tab fastener includes a base, a resilient snap tab depending from the base and a four-way locator depending from the base. The snap tab housing includes a first receiver and a second receiver. The snap tab engages the first receiver and the four-way locator engages the second receiver when the snap tab fastener is connected to the snap tab housing.

6 Claims, 8 Drawing Sheets

(56) References Cited

U.S. PATENT DOCUMENTS

| | | | |
|---|---|---|---|
| 8,966,847 B2* | 3/2015 | Kessler | E04B 1/6804 |
| | | | 52/395 |
| 9,097,270 B2 | 8/2015 | Fitz Roman | |
| 9,676,297 B2 | 6/2017 | Peniche et al. | |
| 2006/0117535 A1 | 6/2006 | Fraser et al. | |
| 2009/0293237 A1* | 12/2009 | Benedetti | B60J 5/0468 |
| | | | 24/289 |
| 2013/0011188 A1 | 1/2013 | Donnelly | |
| 2014/0265449 A1* | 9/2014 | Davis | B62D 65/14 |
| | | | 296/193.06 |

FOREIGN PATENT DOCUMENTS

| | | | |
|---|---|---|---|
| JP | 4017718 B2 | 12/2007 | |
| WO | WO-2008012449 A2 * | 1/2008 | F16B 5/123 |

* cited by examiner

ATTACHMENT DEVICE PROVIDING DOUBLE ENGAGEMENT FOR HIGH RETENTION

TECHNICAL FIELD

This document relates generally to the fastening field and, more particularly, to an attachment device providing for double engagement and high retention.

BACKGROUND

This document relates to a new and improved attachment device that provides a stronger and more durable connection between component parts, keeping them properly positioned, aligned and isolated through assembly and vehicle operation while advantageously eliminating the risk of squeaks and rattles. Advantageously, the attachment device reduces production, manufacturing and labor costs. The attachment device requires low insertion efforts during assembly and facilitates that assembly by locating, locking and retaining the component parts together in a single snapping action.

SUMMARY

In accordance with the purposes and benefits described herein, a new and improved attachment device is provided. That attachment device comprises a snap fastener and a cooperating snap tab housing. The snap tab fastener includes a base and a resilient snap tab depending from the base. The resilient snap tab includes a first locking shoulder on a first face of the resilient snap tab and a second locking shoulder on a second, opposite face of the resilient snap tab. The snap tab housing includes a third locking shoulder and a fourth locking shoulder. The first locking shoulder engages the third locking shoulder and the second locking shoulder engages the fourth locking shoulder when the snap tab fastener is secured to the snap tab housing. Thus, the attachment device provides for double engagement to produce a higher retention force when connecting component parts together.

The snap tab housing may include a first wall and a second wall. The third locking shoulder may be carried on the first wall. The fourth locking shoulder may be carried on the second wall. The snap tab housing may also include a first receiver. That first receiver may be defined between the first wall and the second wall. When the snap tab fastener is secured to the snap tab housing, the resilient snap tab is received and held in the first receiver.

The attachment device may further include a ramp carried on the first wall. The ramp facilitates bending of the resilient snap tab as the resilient snap tab is secured in the first receiver of the snap tab housing. The attachment device also includes a first tunable rib on the first wall adjacent the ramp and in the first receiver.

The snap tab fastener may further include a four-way locator depending from the base. In addition, the snap tab housing may further include a second receiver. When the snap tab fastener is secured to the snap tab housing, the four-way locator may be received and held in the second receiver.

A second tunable rib may be provided on the four-way locator. Further, a third tunable rib may be provided on the second receiver. In at least some of the many possible embodiments, the first locking shoulder may be opposed to and offset from the second locking shoulder. Further, the third shoulder may be offset from the fourth shoulder.

In at least some of the many possible embodiments, the resilient snap tab may include a head having a first cam surface. In addition, the second wall may include a third cam surface. During connection of the snap tab fastener to the snap tab housing, the first cam surface may engage the ramp to bend the resilient snap tab in a first direction and then the second cam surface may engage the third cam surface to bend the second wall in the first direction.

In accordance with an additional aspect, the attachment device comprises a snap tab fastener including a base, a resilient snap tab depending from the base and a four-way locator depending from the base. In addition, the attachment device includes a snap tab housing. The snap tab housing includes a first receiver and a second receiver. The resilient snap tab engages in the first receiver and the four-way locator engages in the second receiver when the snap tab fastener is connected to the snap tab housing.

The first receiver may include a first open end. The second receiver may include a second open end adjacent the first open end.

In addition, the snap tab fastener and the snap tab housing may include a double engagement feature. That double engagement feature may include a first locking shoulder and a second, opposite locking shoulder on the snap tab fastener and a third locking shoulder and a fourth locking shoulder on the snap tab housing. When the snap tab fastener is connected to the snap tab housing, the first locking shoulder may engage the third locking shoulder and the second locking shoulder may engage the fourth locking shoulder.

A first tunable rib may be provided on the snap tab housing in the first receiver. A second tunable rib may be provided on the four-way locator. A third tunable rib may be provided on the snap tab housing in the second receiver. The first locking shoulder may be offset from the second locking shoulder and the third locking shoulder may be offset from the fourth locking shoulder. In addition, a ramp may be provided on the snap tab housing.

In the following description, there are shown and described several preferred embodiments of the attachment device. As it should be realized, the attachment device is capable of other, different embodiments and its several details are capable of modification in various, obvious aspects all without departing from the attachment device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the m attachment device and together with the description serve to explain certain principles thereof.

FIG. 5b is a cross sectional taken along line 5b-5b of FIG. 5a.

Reference will now be made in detail to the present preferred embodiments of the attachment device, examples of which are illustrated in the accompanying drawing figures.

DETAILED DESCRIPTION

Figure 2A:
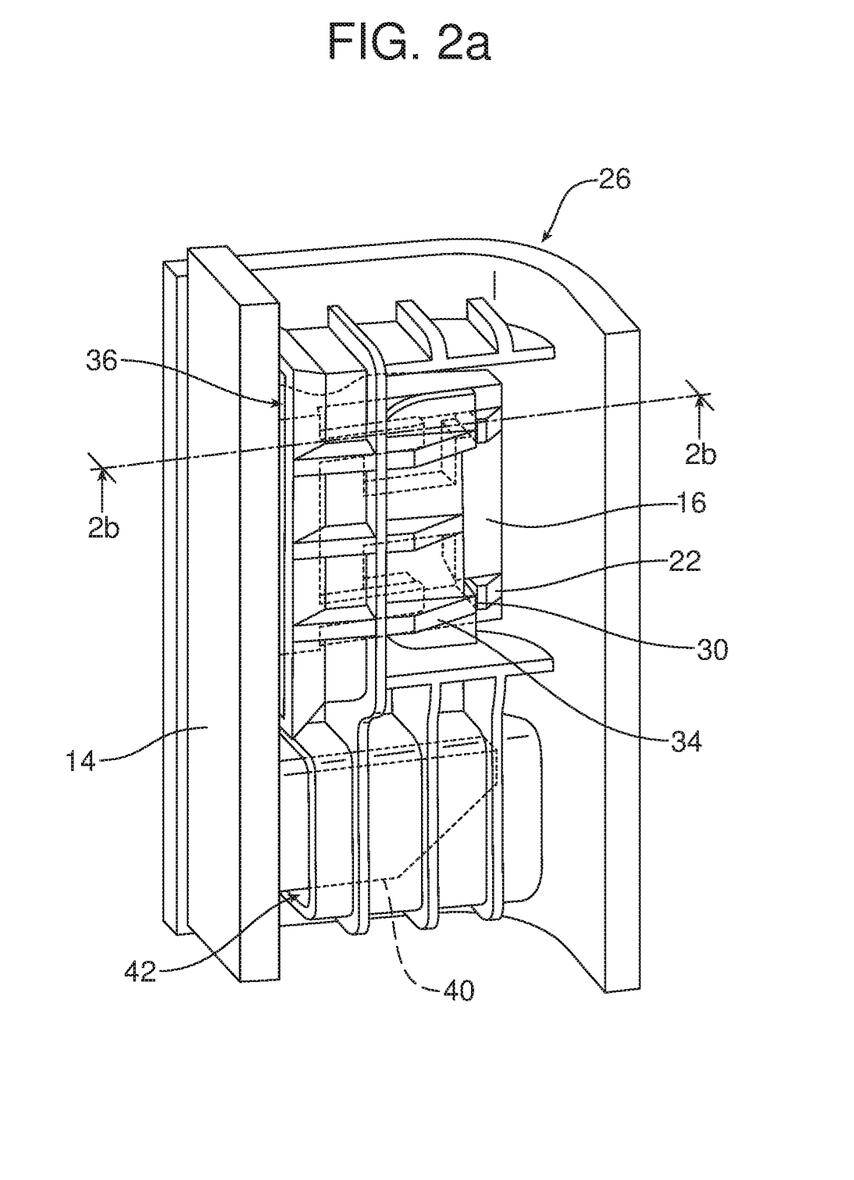
FIG. 2a is a detailed perspective view of the attachment device showing the snap tab fastener assembled with the snap tab housing.
Figure 2B:
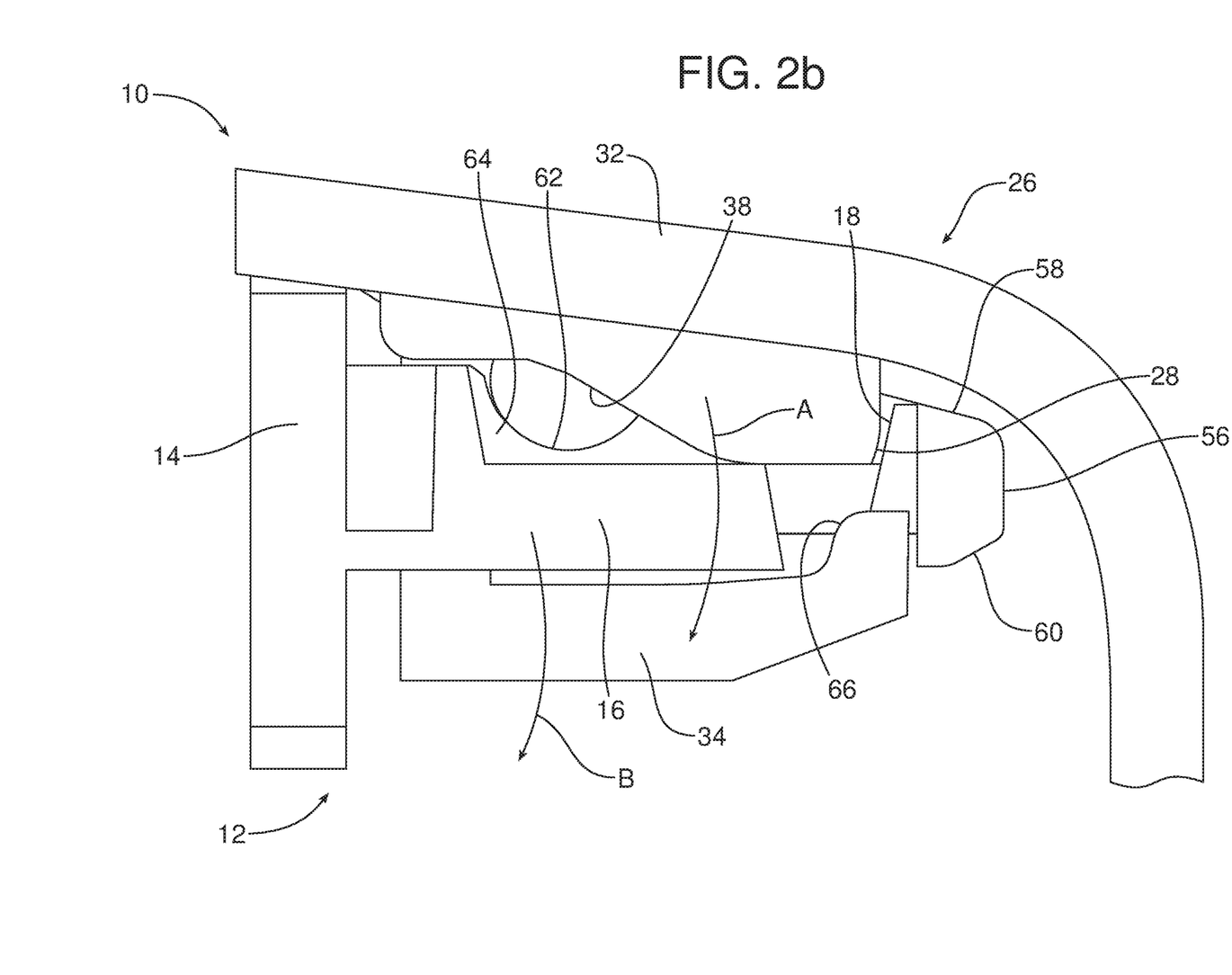
FIG. 2b is a cross sectional view of the assembled attachment device taken along line 2b-2b of FIG. 2a so as to clearly illustrate the double engagement between the snap tab fastener and the snap tab housing.
Figure 3:
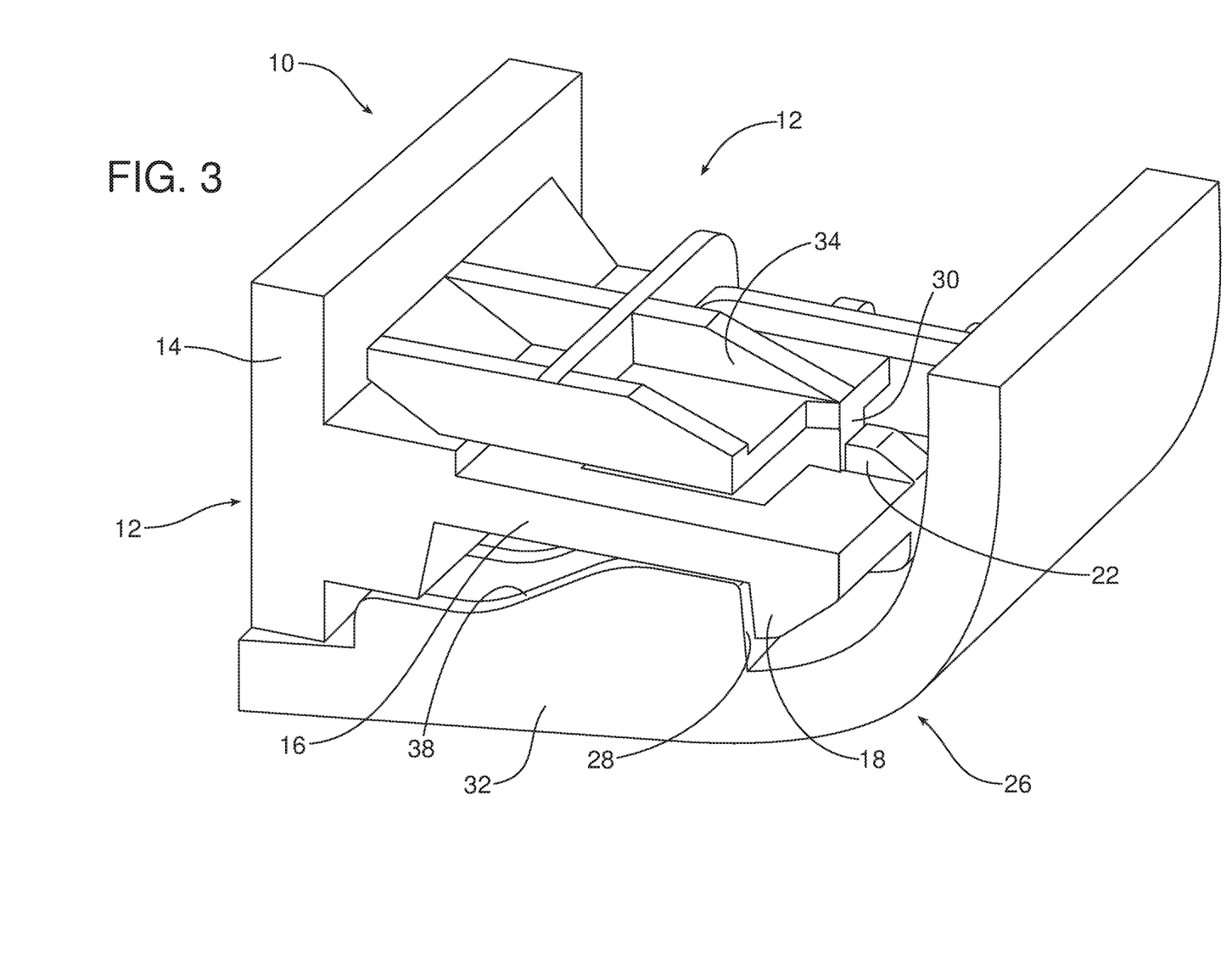
FIG. 3 is an additional perspective view of the assembled attachment device showing the double engagement.
Figure 4A:
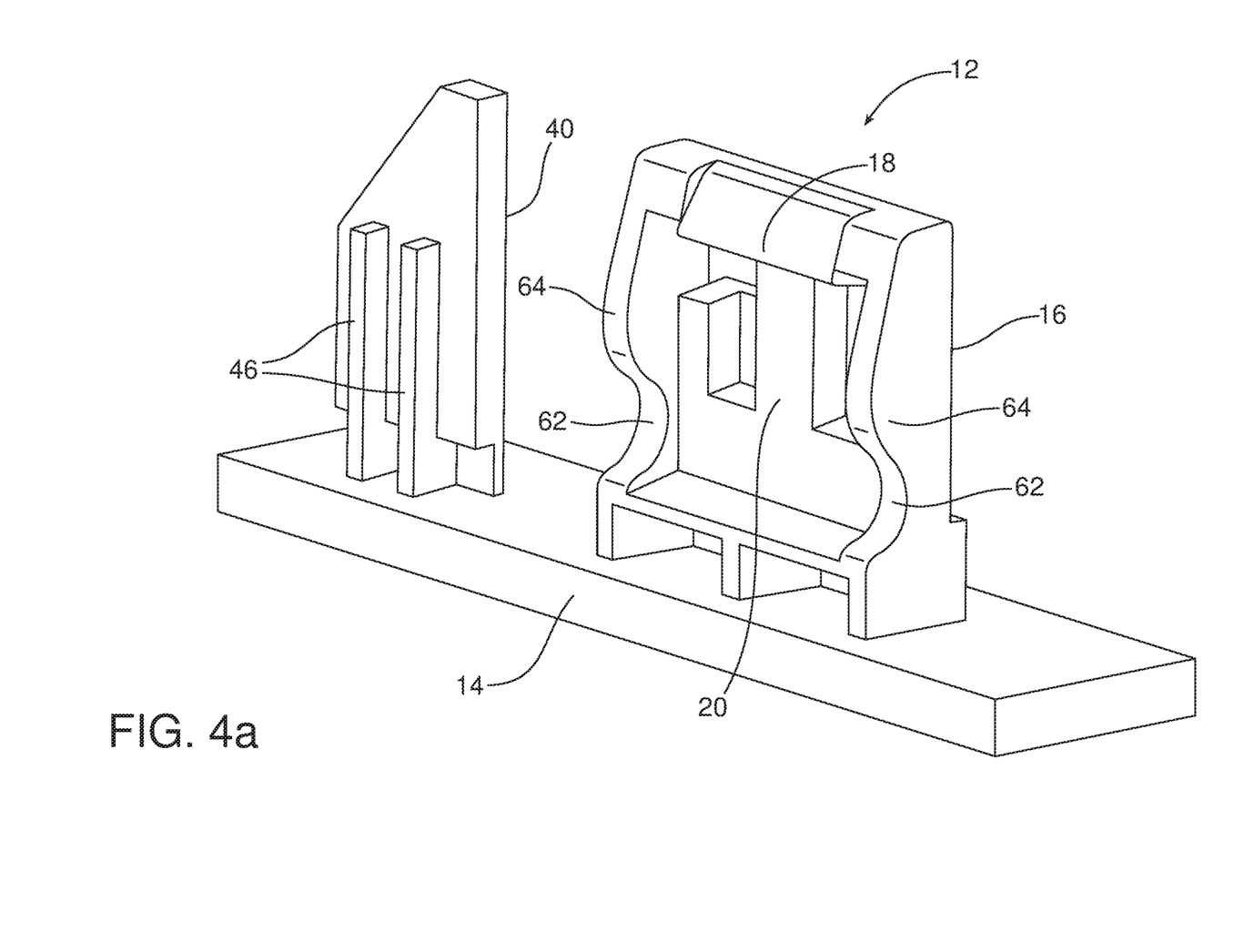
FIG. 4a is a detailed perspective view of a first side of the snap tab fastener.
Figure 4B:
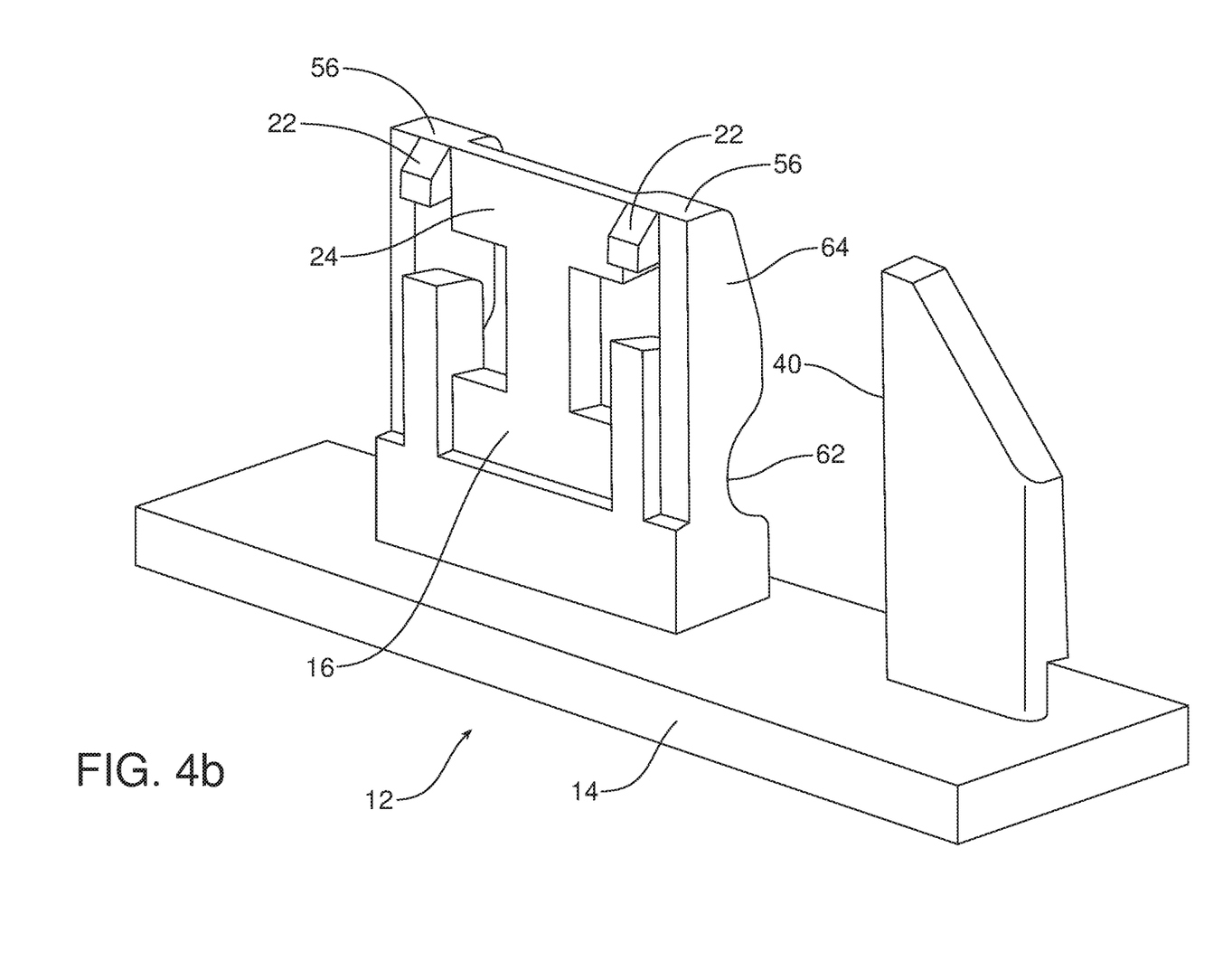
FIG. 4b is a detailed perspective view of a second, opposite side of the snap tab fastener.
Figure 5A:
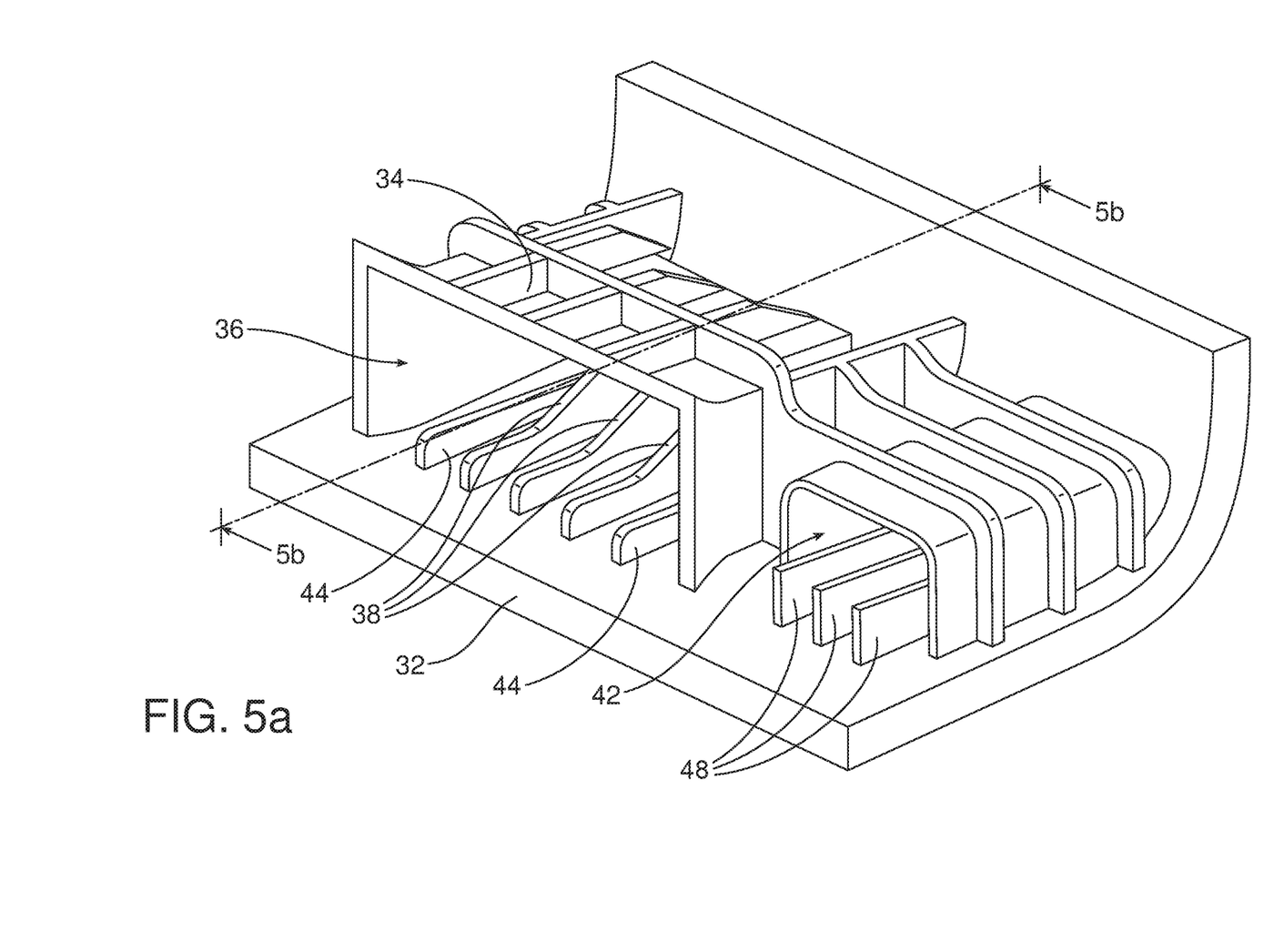
FIG. 5a is a detailed perspective view of a first side of the snap tab housing.
Figure 5B:
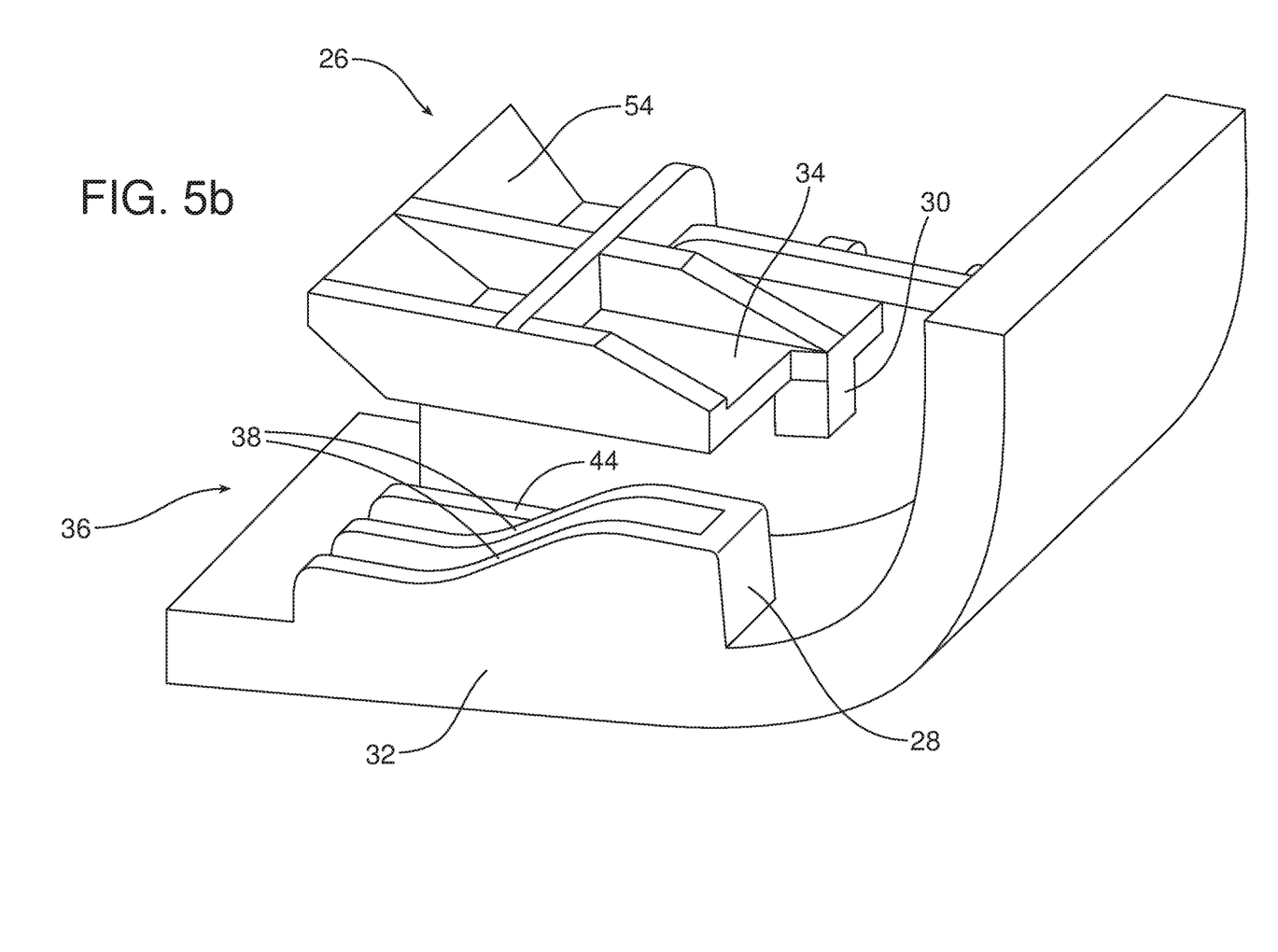

Reference is now made to the drawing FIGS. 1, 2a, 2b, 3, 4a, 4b, 5a and 5b illustrating the new and improved attachment device 10. The attachment device 10 includes a snap tab fastener 12 of the cantilever type including a base 14 and a resilient snap tab 16 depending from the base. The resilient snap tab 16 includes a first locking shoulder 18 on a first face 20 of the resilient snap tab 16 and a second locking shoulder 22 on a second, opposite face 24 of the resilient snap tab. As best illustrated in FIGS. 4a and 4b, the first locking shoulder 18 is opposed to and offset from the second (split) locking shoulder 22. In the illustrated embodiment, the second locking shoulder 22 is split and extends outboard of the first locking shoulder 18 at both ends.

The attachment device 10 also includes a snap tab housing 26. The snap tab housing 26 includes a third locking shoulder 28 and a fourth locking shoulder 30. The third and fourth locking shoulders 28, 30 are offset from each other in the same manner as the first and second locking shoulders 18, 22. See, for example FIGS. 3 and 5b.

The snap tab fastener 12 is connected to or integrally formed as a part of a first component part while the snap tab housing 26 is connected to or integrally formed as a part of a second component part. When the snap tab fastener 12 is secured in the snap tab housing 26, the two component parts are securely connected together.

More specifically, as best illustrated in FIGS. 2a, 2b and 3, when the snap tab fastener 12 is connected and secured to the snap tab housing 26, the first locking shoulder 18 engages the third locking shoulder 28 and the second locking shoulder 22 engages the fourth locking shoulder 30. Thus, a double engagement is provided, producing a high retention force for connecting the component parts together with the attachment device 10.

In the illustrated embodiment, the snap tab housing 26 includes a first wall 32 and a second wall 34. The third locking shoulder 28 is carried on the first wall 32. The fourth locking shoulder 30 is carried on the second wall 34. As should be further appreciated, the snap tab housing 26 also includes a first receiver, generally designated by reference numeral 36 that is defined between the first wall 32 and the second wall 34. When the snap tab fastener 12 is secured to the snap tab housing 26, the resilient snap tab 16 is received and held in the first receiver 36.

A ramp 38 is provided or carried on the first wall 32. The ramp 38 facilitates bending of the resilient snap tab 16 in a first direction (note action arrow A in FIG. 2b) as the snap tab is secured in the first receiver of the snap tab housing 26. The snap tab fastener 12 further includes a four-way locator 40 depending from the base 14. The four-way locator 40 and the resilient snap tab 16 of the illustrated embodiment project in the same direction from the base 14 and are spaced apart and parallel to one another. The snap tab housing 26 further includes a second receiver 42 spaced from and parallel to the first receiver 36. The four-way locator 40 is received and held in the second receiver 42 when the snap tab fastener 12 is secured to the snap tab housing 26 (see FIGS. 2a and 3).

A series of tunable ribs 44, 46, 48 function to ensure an optimum fit and connection between the snap tab fastener 12 and the snap tab housing 26. The first tunable rib 44 is provided on the first wall 32 of the snap tab housing 26 adjacent the ramp 38. In the illustrated embodiment, the first tunable rib 44 comprises two sections with one section provided outboard of each side of the ramp 38.

The second tunable rib 46 is provided on the four-way locator 40 (see FIG. 4a). In the illustrated embodiment, the second tunable rib 46 is also provided in two sections. The third tunable rib 48 is provided on the first wall and projects into the second receiver 42. In the illustrated embodiment, the third tunable rib 48 includes three sections.

Figure 1:
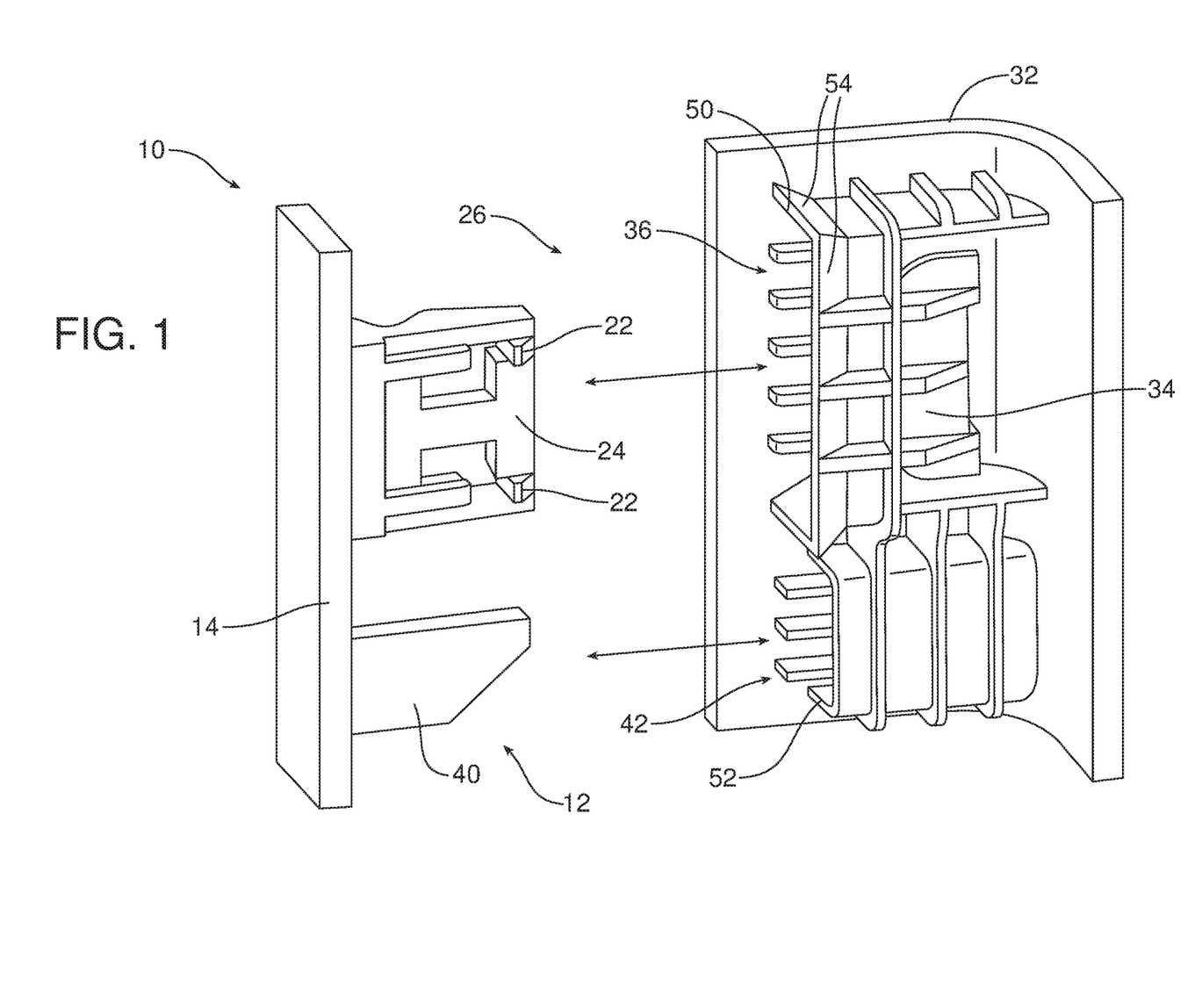
FIG. 1 is an exploded perspective view of the attachment device including the snap tab fastener and the cooperating snap tab housing that are connected together to provide a double engagement with high retention.

When one wishes to connect the snap tab fastener 12 with the snap tab housing 26, the resilient snap tab 16 is aligned with a first open end 50 of the first receiver 36 while the four-way locator 40 is aligned with a second open end 52 of the second receiver 42 (see FIG. 1). As the snap tab fastener 12 is connected to the snap tab housing 26, the converging entry walls 54 of the first open end 50 function to guide the resilient snap tab 16 into the correct assembly position. As should be appreciated from reviewing FIG. 2b, the resilient snap tab 16 includes a head 56 having a first cam surface 58 and a second cam surface 60. During connection the first cam surface 58 engages the ramp 38 which has a slope of approximately 30 degrees to facilitate the bending of the resilient snap tab 16 in the direction of action arrow A during the insertion or assembly process. The bending of the resilient snap tab 16 is facilitated by the arcuate notches 62 provided in the end walls 64 of the resilient snap tab 16.

During the insertion process the second cam surface 60 of the head 56 of the resilient snap tab 16 also engages a third cam surface 66 on the second wall 34 of the snap tab housing 26. This engagement between the second cam surface 60 and the third cam surface 66 functions to bend the second wall 34 in the first direction (note action arrow B in FIG. 2b). The bending of the resilient snap tab 16 of the snap tab fastener 12 and the resilient second wall 34 of the snap tab housing 26 simultaneously generates a restoring force in the resilient snap tab and the second wall to return to their rest positions. As a consequence, the resulting double engagement provides a high retention force to the connection between the snap tab fastener 12 and the snap tab housing 26 of the attachment device 10.

Once the snap tab fastener 12 and the snap tab housing 26 are fully seated and connected together, the tunable ribs 44, 46, 48 ensure an optimal fit to prevent the risk of squeaks and rattles between the component parts connected by the attachment device 10.

The main function of the four-way locator 40 is to prevent damage to the snap tab fastener 12 and the snap tab housing 26 during the disassembly process. The four-way locator 40 also ensures that the snap tab fastener 12 and snap tab housing 26 always work in a normal direction to any load applied to the attachment device 10. As a result, any deformation of the resilient snap tab 16 is controlled by the four-way locator 40.

The relatively large radius of the arcuate notches 62 in the end walls 64 of the resilient snap tab 16 function to distribute stress and ensure that the stress generated during the assembly and disassembly process is below the yield strength of the material from which the snap tab fastener 12 and snap tab housing 26 are made.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An attachment device, comprising:
a snap tab fastener including a base, a resilient snap tab depending from said base, and a four-way locator depending from said base, said four-way locator including a first tunable rib, said resilient snap tab including a first locking shoulder on a first face of said resilient snap tab and a second locking shoulder on a second opposite face of said resilient snap tab, said first locking shoulder being opposed to and offset from horizontal and vertical alignment with said second locking shoulder;
a snap tab housing including a third locking shoulder and a fourth locking shoulder wherein said first locking shoulder engages said third locking shoulder and said second locking shoulder engages said fourth locking shoulder when said snap tab fastener is secured to said snap tab housing, said snap tab housing also including a second tunable rib, wherein said snap tab housing includes a first wall and a resilient second wall, said third locking shoulder is carried on said first wall and said fourth locking shoulder is carried on said resilient second wall, and wherein said snap tab housing includes a first receiver defined between said first wall and said resilient second wall, said resilient snap tab being received and held in said first receiver when said snap tab fastener is secured to said snap tab housing; and
a ramp carried on said first wall, said ramp facilitating bending of said resilient snap tab as said resilient snap tab is secured in said first receiver of said snap tab housing, wherein the second tunable rib on said snap tab housing is adjacent said ramp and in said first receiver, said second tunable rib including two sections with said ramp being provided between said two sections.

2. The attachment device of claim 1, wherein said snap tab housing further includes a second receiver, said four-way locator being received and held in said second receiver when said snap tab fastener is secured to said snap tab housing.

3. The attachment device of claim 2, further including a third tunable rib on said snap tab housing and in said second receiver.

4. The attachment device of claim 3, wherein said third locking shoulder is offset from said fourth locking shoulder.

5. The attachment device of claim 4, wherein said resilient snap tab includes a head having a first cam surface and a second cam surface.

6. The attachment device of claim 5, wherein said resilient second wall includes a third cam surface and during connection of said snap tab fastener to said snap tab housing said first cam surface engages said ramp to bend said resilient snap tab in a first direction and then said second cam surface engages said third cam surface to bend said resilient second wall in said first direction.

* * * * *